(12) United States Patent
Zhou

(10) Patent No.: US 11,634,192 B2
(45) Date of Patent: Apr. 25, 2023

(54) BICYCLE HANDLEBAR

(71) Applicant: FOSHAN NANHAI SANEAGLE BICYCLE CO., LTD, Foshan (CN)

(72) Inventor: Kunhua Zhou, Foshan (CN)

(73) Assignee: FOSHAN NANHAI SANEAGLE BICYCLE CO., LTD, Foshan (CN)

( * ) Notice: Subject to any disclaimer, the term of this patent is extended or adjusted under 35 U.S.C. 154(b) by 138 days.

(21) Appl. No.: 17/118,618

(22) Filed: Dec. 11, 2020

(65) Prior Publication Data
US 2022/0185420 A1 Jun. 16, 2022

(51) Int. Cl.
*B62K 21/12* (2006.01)
*B62K 21/18* (2006.01)
*B62J 6/01* (2020.01)
*B62J 33/00* (2006.01)
*B62J 45/00* (2020.01)
*B62K 21/22* (2006.01)
*B62J 6/015* (2020.01)
*B62L 3/02* (2006.01)

(52) U.S. Cl.
CPC .............. *B62K 21/12* (2013.01); *B62J 6/015* (2020.02); *B62J 33/00* (2013.01); *B62J 45/00* (2020.02); *B62K 21/22* (2013.01); *B62L 3/02* (2013.01)

(58) Field of Classification Search
CPC ........ B62K 21/12; B62K 21/16; B62K 21/22; B62K 21/24; B62K 21/26; B62J 6/015; B62J 33/00; B62J 45/00; B62L 3/02
See application file for complete search history.

(56) References Cited

U.S. PATENT DOCUMENTS

| | | | | |
|---|---|---|---|---|
| 564,741 A | * | 7/1896 | Dunn | B62K 21/22 403/376 |
| 570,179 A | * | 10/1896 | Miller | B62K 21/22 403/104 |
| 8,870,421 B2 | * | 10/2014 | Ward | B62J 6/029 362/543 |
| 9,024,236 B2 | * | 5/2015 | Kurumagawa | B62K 21/26 219/202 |

(Continued)

FOREIGN PATENT DOCUMENTS

| CN | 202345828 U | * | 7/2012 |
|---|---|---|---|
| CN | 203593112 U | * | 5/2014 |

(Continued)

*Primary Examiner* — Adam D Rogers
(74) *Attorney, Agent, or Firm* — Nitin Kaushik

(57) ABSTRACT

The utility model discloses an improved bicycle handlebar, including a handlebar tube and a handlebar head. The handlebar head includes a curved arm and grips. The curved arm is of a structure that inclines forward relative to the handlebar tube. The grips naturally stretch along two ends of the curved arm toward the left and right sides. The handlebar tube is provided with a positioning groove and a limiting hole, a support tube is provided with a positioning protruding portion. After the handlebar tube is inserted into the support tube, the positioning protruding portion is inserted into the positioning groove to ensure that the handlebar will not rotate by itself. Screw the limit screw into the limiting hole to prevent the handlebar from being too deep to pull out. The handlebar is designed to be of a structure, which is more comfortable to use.

7 Claims, 3 Drawing Sheets

(56) References Cited

U.S. PATENT DOCUMENTS

| | | | | |
|---|---|---|---|---|
| 2002/0140203 | A1* | 10/2002 | Chen | B62K 15/006 |
| | | | | 280/287 |
| 2002/0144568 | A1* | 10/2002 | Chen | B62K 21/12 |
| | | | | 74/551.7 |
| 2002/0157499 | A1* | 10/2002 | Liao | B62K 21/12 |
| | | | | 74/551.1 |
| 2004/0129471 | A1* | 7/2004 | Cheng | B62K 21/22 |
| | | | | 180/181 |
| 2007/0241531 | A1* | 10/2007 | D'Aluisio | B29C 70/446 |
| | | | | 280/279 |
| 2020/0277017 | A1* | 9/2020 | Mazoyer | B62K 15/006 |

FOREIGN PATENT DOCUMENTS

| | | | | | |
|---|---|---|---|---|---|
| CN | 204432886 | U | * | 7/2015 | |
| CN | 103640656 | B | * | 11/2015 | |
| DE | 4420836 | A1 | * | 12/1995 | B62J 6/00 |
| DE | 19924160 | A1 | * | 1/2001 | B62K 21/16 |
| JP | H0672376 | A | * | 3/1994 | |
| KR | 200380437 | Y1 | * | 3/2005 | |
| KR | 20220008015 | A | * | 1/2022 | |

* cited by examiner

BICYCLE HANDLEBAR

TECHNICAL FIELD

The utility model relates to the field of bicycle technology, and specifically to a handlebar of a bicycle.

BACKGROUND

With the growing awareness of health and fitness, vehicles such as bicycles that provide both exercise and practical use regain increasingly wide popularity among ordinary people. The design of existing bicycle handlebars generally still follows conventional concepts. For example, a handlebar head is vertically disposed or inclines backward. This structure is not particularly beneficial to ride comfort in practice. For another example, a handlebar tube is inserted in a support tube of a bicycle through a cylinder, and the handlebar tube and the support tube are then tightly fastened by a rivet ring. However, even with such an arrangement, for example, the handlebar may still rotate under an excessive force or a strong impact. As a result, the handlebar becomes askew, and normal riding is affected. The operations are relatively complex to correct the position of the handlebar. Furthermore, although the handlebar is tightly fastened at the start position, the support tube is prone to loosening after use for a period of time. In this case, the handlebar may fall excessively deep, and it becomes difficult to pull out the handlebar. In addition, grips are usually wrapped by rubber or plastic handlebar coverings. However, when the air temperature is low in winter, the handlebar coverings are also too cold to be comfortably or pleasantly held by a user.

SUMMARY

In view of the disadvantages in the prior art, the utility model provides an improved bicycle handlebar that has a simple structure and more appropriate design and can keep the handlebar at the correct position, prevent the handlebar from falling too deep to be pulled out, and provide better ride comfort.

To resolve the foregoing technical problem, the utility model adopts the following technical solution: an improved bicycle handlebar, including a handlebar tube and a handlebar head, wherein the handlebar head includes a curved arm and grips, a middle section of the curved arm is fixedly connected to a top end of the handlebar tube, the grips are formed by outward extension of two ends of the curved arm, and each grip is fixed with a handlebar covering and a brake lever; the curved arm is of a structure that inclines forward relative to the handlebar tube, and the grips naturally stretch along the two ends of the curved arm toward the left and right sides, so that the entire handlebar head forms a structure that inclines forward; a positioning groove that is concave toward the inside of the tube and longitudinally extends along the handlebar tube is provided in the outer surface of a tube wall of the handlebar tube, and the handlebar tube and a tube wall positioning protrusion of a bicycle handlebar support tube form a mutually-inserted positioning structure through the positioning groove; and a limiting hole horizontally penetrating the handlebar tube is provided at an upper position of the handlebar tube, and a limiting screw is threaded in the limiting hole to form a limiting structure capable of locking a top end of the bicycle handlebar support tube.

Preferentially, the positioning groove is provided in the rear surface of the handlebar tube, the positioning groove is an arc-shaped slot whose cross section is of a V-shaped structure, with an opening angle of 50 degrees to 70 degrees, for example, 64 degrees.

Preferentially, an angle formed between the handlebar head and the handlebar tube is 30 degrees to 40 degrees, for example, 35 degrees. In this way, the upper body of a rider can further incline forward to provide better ergonomics, the forward extension distance is increased, the ride comfort is improved, and the pedals can be pressed more easily.

Further, the limiting hole is provided in the front surface of the handlebar tube and extends into the positioning groove, so that after the screw is tightened, the handlebar can be prevented from being inserted too deep to be pulled out.

Further, a heating member is wrapped in the handlebar covering, and the heating member is connected to a power supply device.

Further, the power supply device is a solar photovoltaic mechanism, a solar panel of the solar photovoltaic mechanism is mounted in a tilted manner in a middle area of the curved arm, and a tilt angle of the solar panel is the same as that of the handlebar head, so that the solar panel does not significantly affect the structure of a bicycle; and the solar photovoltaic mechanism is connected to a switch by a power cable and is then connected to the heating member via the switch, the power cable passes through the handlebar head, and the switch is mounted on the grip in a position near the handlebar covering.

Further, the heating member is a positive temperature coefficient (PTC) heating sheet. This heating manner is widely applied to gloves, mousepads, shoe inserts, and the like, and is safe, reliable, and readily usable.

Further, a light-emitting diode (LED) illumination lamp is further mounted on the handlebar head, the LED illumination lamp is connected to the switch by the power cable and is connected to the solar photovoltaic mechanism via the switch, and the switch may be used to control the heating sheet to be turned on or off and may also be used to control the LED illumination lamp. In this way, solar energy may be used to supply power. This manner is the same as that of portable solar yard lamps that are commercially available and widely applied at present, and can be used very conveniently without needing extra charging or additional batteries.

In the utility model, a positioning groove is provided in a handlebar tube, and a support tube of a bicycle is also provided with a positioning protruding portion, so that after the handlebar tube is inserted into the support tube, the positioning protruding portion is inserted into the positioning groove. In this way, it can be ensured that the handlebar does not rotate freely and is always kept at the correct position. The handlebar is designed to be of a structure that inclines forward to provide better ergonomics and more comfortable use. A limiting hole is provided in the upper portion of the handlebar tube to tighten a limiting screw, so that the handlebar can be prevented from being inserted too deep to be pulled out. In addition, a heating sheet is disposed in the handlebar covering, and solar energy is used to supply power, so that the handlebar generates heat and is more comfortable to use in winter.

In the figures: 1, handlebar tube, 2, curved arm, 3, grip, 4, brake lever, 5, handlebar covering, 6, solar panel, 7, power cable, 8, positioning groove, 9, limiting hole, and 10, switch.

DETAILED DESCRIPTION

Figure 1:
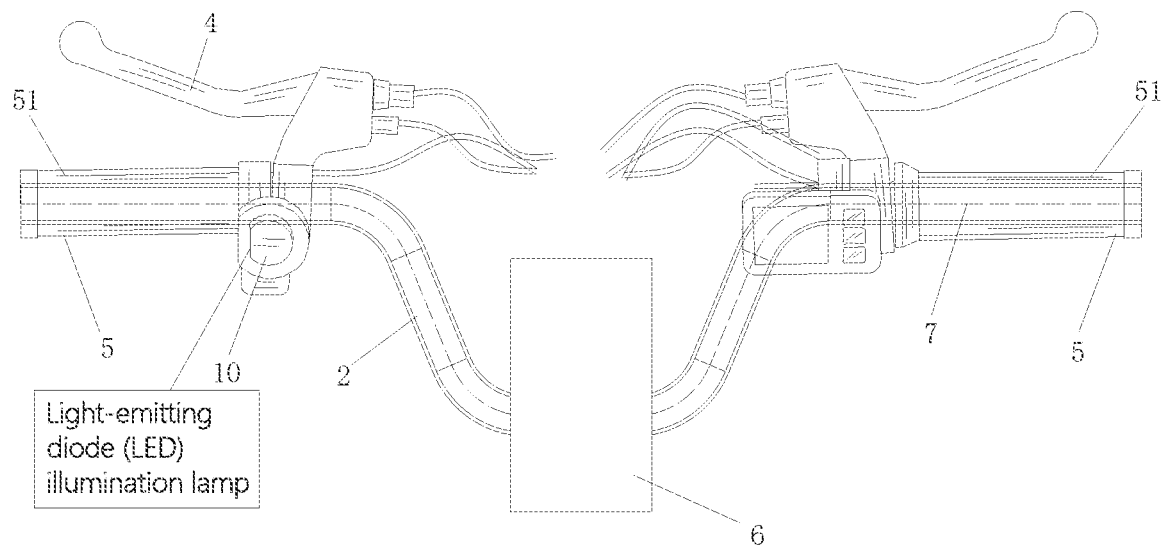
FIG. 1 is a schematic diagram of an overall structure according to the utility model.
Figure 2:
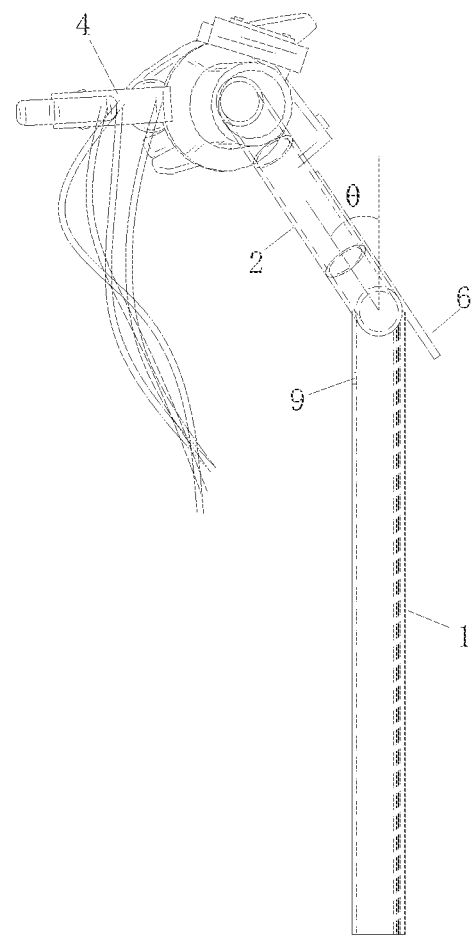
FIG. 2 is a schematic diagram of a lateral structure according to the utility model.
Figure 3:
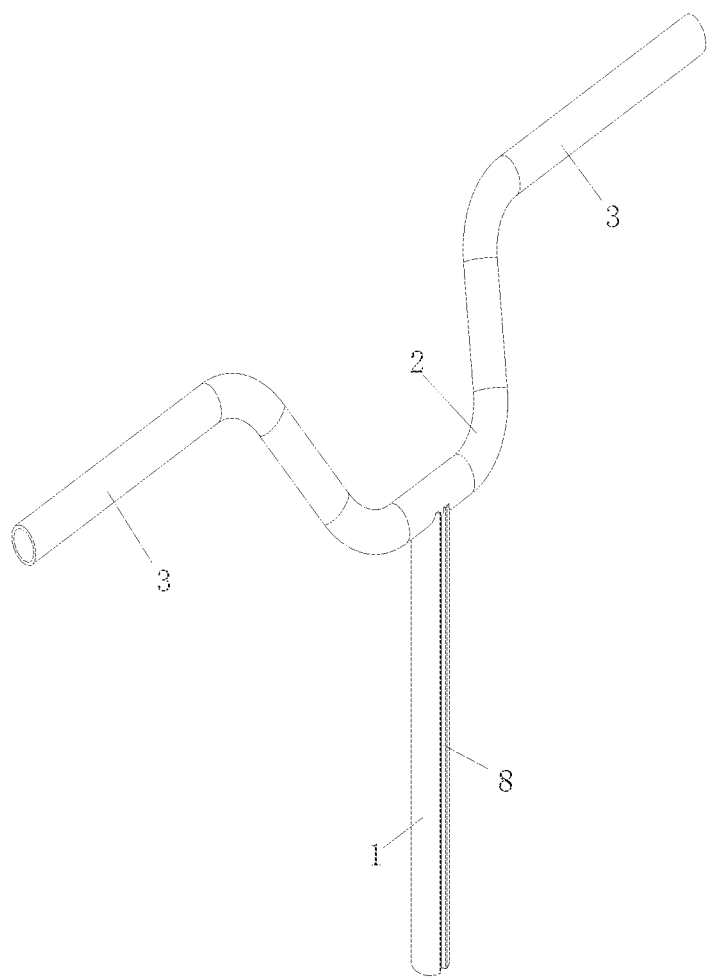
FIG. 3 is a three-dimensional structural diagram of a naked handlebar according to the utility model.
Figure 4:
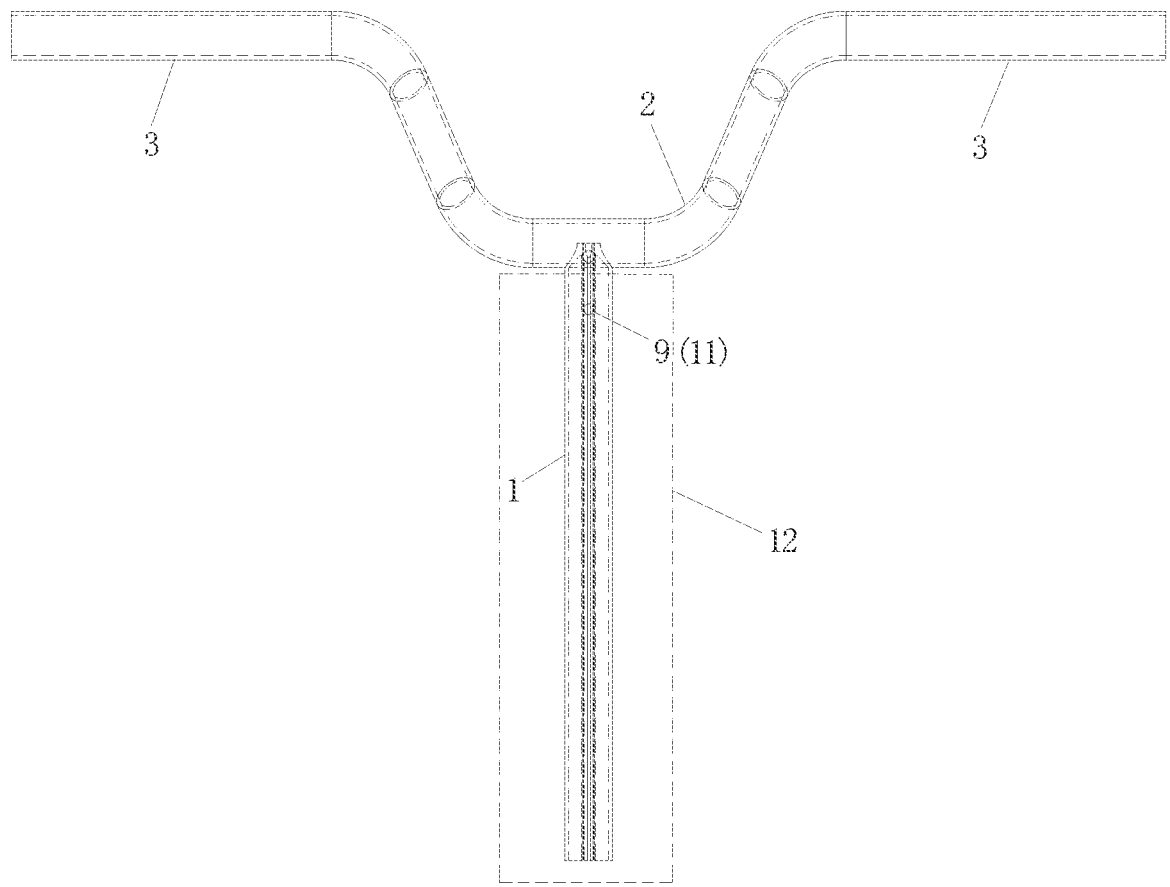
FIG. 4 is a rear structural diagram of a naked handlebar according to the utility model.
Figure 5:
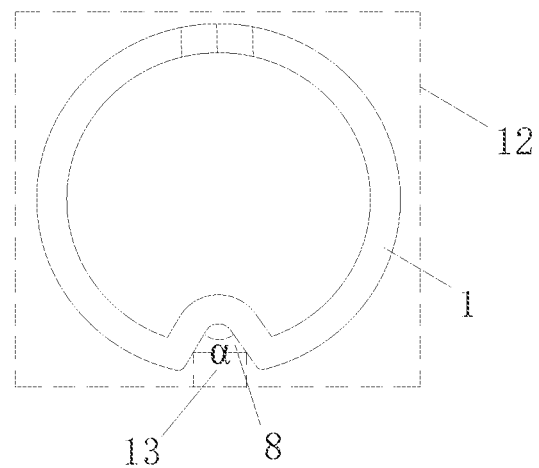
FIG. 5 is a schematic cross-sectional view of a handlebar tube.

In this embodiment, referring to FIG. 1 to FIG. 5, an improved bicycle handlebar includes a handlebar tube 1 and a handlebar head. The handlebar head includes a curved arm 2 and grips 3. A middle section of the curved arm 2 is fixedly connected to a top end of the handlebar tube 1. The grips 3 are formed by outward extension of two ends of the curved arm 2. Each grip 3 is fixed with a handlebar covering 5 and a brake lever 4. The curved arm 2 is of a structure that inclines forward relative to the handlebar tube 1. The grips 3 naturally stretch along the two ends of the curved arm 2 toward the left and right sides, so that the entire handlebar head forms a structure that inclines forward. A positioning groove 8 that is concave toward the inside of the tube and longitudinally extends along the handlebar tube 1 is provided in the outer surface of a tube wall of the handlebar tube 1. The handlebar tube 1 and a tube wall positioning protrusion 13 of a bicycle handlebar support tube 12 form a mutually-inserted positioning structure through the positioning groove 8. A limiting hole 9 horizontally penetrating the handlebar tube 1 is provided at an upper position of the handlebar tube 1. A limiting screw 11 is threaded in the limiting hole 9 to form a limiting structure capable of locking a top end of the bicycle handlebar support tube 12.

The positioning groove 8 is provided in the rear surface (that is, the surface toward the saddle) of the handlebar tube 1. The positioning groove 8 is an arc-shaped slot whose cross section is a V-shaped structure, with an opening angle α of 50 degrees to 70 degrees, for example, 64 degrees.

An angle θ formed between the handlebar head and the handlebar tube 1 is 30 degrees to 40 degrees, for example, 35 degrees. In this way, the upper body of a rider can further incline forward to provide better ergonomics, the forward extension distance is increased, the ride comfort is improved, and the pedals can be pressed more easily.

The limiting hole 9 is provided in the front surface of the handlebar tube 1 and extends into the positioning groove 8, so that after the screw is tightened, the handlebar can be prevented from being inserted too deep to be pulled out.

A heating member 51 is wrapped in the handlebar covering 5, and the heating member 51 is connected to a power supply device.

The power supply device is a solar photovoltaic mechanism. A solar panel 6 of the solar photovoltaic mechanism is mounted in a tilted manner in a middle area of the curved arm 2, and a tilt angle of the solar panel 6 is the same as that of the handlebar head, so that the solar panel 6 does not significantly affect the structure of a bicycle. The solar photovoltaic mechanism is connected to a switch 10 by a power cable 7 and is then connected to the heating member 51 via the switch 10. The power cable 7 passes through the handlebar head. The switch 10 is mounted on the grip 3 in a position near the handlebar covering 5.

The heating member 51 is a PTC heating sheet. This heating manner is widely applied to gloves, mousepads, shoe inserts, and the like, and is safe, reliable, and readily usable.

An LED illumination lamp (not shown) is further mounted on the handlebar head. The LED illumination lamp is connected to the switch 10 by the power cable 7 and is connected to the solar photovoltaic mechanism via the switch 10. The switch 10 may be used to control the heating sheet to be turned on or off and may also be used to control the LED illumination lamp. In this way, solar energy may be used to supply power. This manner is the same as that of portable solar yard lamps that are commercially available and widely applied at present, and can be used very conveniently without needing extra charging or additional batteries.

The utility model is described above in detail. The foregoing description provides only preferred embodiments of the utility model and should not be used to limit the implementation scope of the utility model. That is, equivalent changes and modifications made in accordance with the scope of this application shall all still fall within the scope of the utility model.

What is claimed is:

1. A bicycle handlebar, comprising a handlebar tube and a handlebar head, wherein the handlebar head comprises a curved arm and grips, a middle section of the curved arm is fixedly connected to a top end of the handlebar tube, and the grips are formed by outward extension of two ends of the curved arm, and each grip is fixed with a handlebar covering and a brake lever; wherein the curved arm is of a structure that inclines forward relative to the handlebar tube, and the grips stretch along the two ends of the curved arm toward the left and right sides, so that the entire handlebar head forms a structure that inclines forward; a positioning groove that is concave toward the inside of the handlebar tube and longitudinally extends along the handlebar tube is provided in the outer surface of a tube wall of the handlebar tube, and the handlebar tube and a tube wall positioning protrusion of a bicycle handlebar support tube form a mutually-inserted positioning structure through the positioning groove; and a limiting hole horizontally penetrating the handlebar tube is provided at an upper position of the handlebar tube, and a limiting screw is threaded in the limiting hole to form a limiting structure capable of locking a top end of the bicycle handlebar support tube;

wherein the positioning groove is provided in the rear surface of the handlebar tube, and the positioning groove is an arc-shaped slot whose cross section is a V-shaped structure, with an opening angle of 50 degrees to 70 degrees.

2. The bicycle handlebar according to claim 1, wherein an angle formed between the handlebar head and the handlebar tube is 30 degrees to 40 degrees.

3. The bicycle handlebar according to claim 1, wherein the limiting hole is provided in the front surface of the handlebar tube and extends into the positioning groove.

4. The bicycle handlebar according to claim 1, wherein a heating member is wrapped in the handlebar covering, and the heating member is connected to a power supply device.

5. The bicycle handlebar according to claim 4, wherein the power supply device is a solar photovoltaic mechanism, a solar panel of the solar photovoltaic mechanism is mounted in a tilted manner in the middle section of the curved arm, and a tilt angle of the solar panel is the same as that of the handlebar head; and the solar photovoltaic mechanism is connected to a switch by a power cable and is then connected to the heating member via the switch, the power cable passes through the handlebar head, and the switch is mounted on one of the grips on a side of the handlebar covering.

6. The bicycle handlebar according to claim 5, wherein the heating member is a positive temperature coefficient (PTC) heating sheet.

7. The bicycle handlebar according to claim 5, wherein a light-emitting diode (LED) illumination lamp is further mounted on the handlebar head, and the LED illumination lamp is connected to the switch by the power cable and is connected to the solar photovoltaic mechanism via the switch.

\* \* \* \* \*